Sept. 2, 1947.  W. T. JONES  2,426,616
PROCESS OF TREATING CHOCOLATE LIQUOR
Filed Dec. 12, 1944
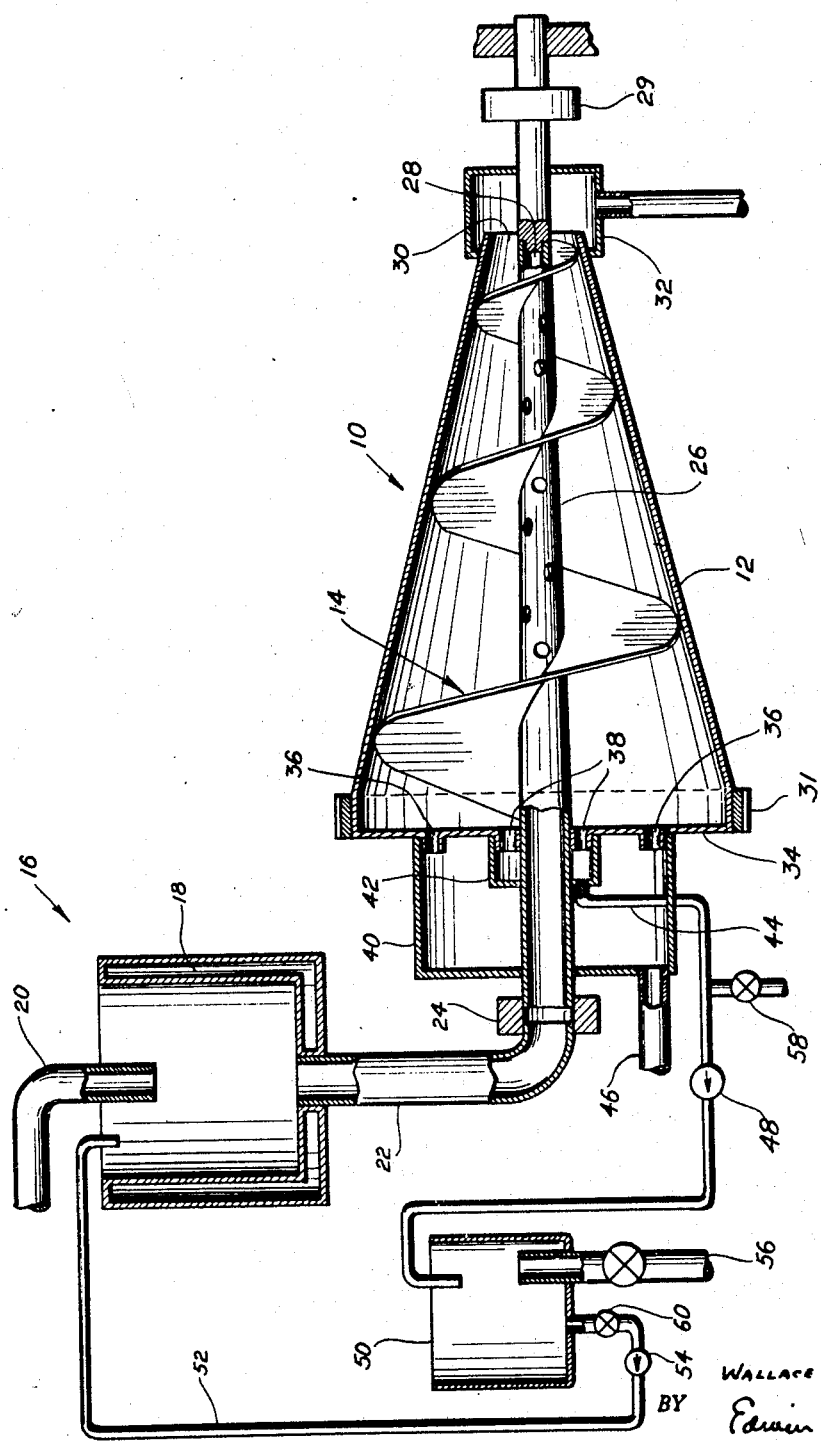
INVENTOR.
WALLACE T. JONES
BY
ATTORNEY.

Patented Sept. 2, 1947

2,426,616

UNITED STATES PATENT OFFICE 2,426,616

PROCESS OF TREATING CHOCOLATE LIQUOR

Wallace T. Jones, New York, N. Y., assignor to Rockwood & Co., Brooklyn, N. Y., a corporation of Delaware Application December 12, 1944, Serial No. 567,887

7 Claims. (Cl. 99—23)

This invention relates to the treatment of chocolate liquor, and more particularly to a process of treating chocolate liquor in such manner as to remove the residual gritty material contained therein and to produce substantially grit-free chocolate liquor of a predetermined cocoa butter fat content.

In the manufacture of chocolate liquor, cocoa beans are first cleaned, roasted and subjected to cracking, fanning and sieving devices in order to free the broken kernels or "nibs" from the cocoa shells, cocoa dust and other extraneous material. Although improved methods have been adopted for the removal of such extraneous material, it is impossible or commercially impractical to remove by such methods all of the gritty material.

In order to convert the cocoa nibs to a chocolate liquor the same is subjected to grinding such as in multiple stone mills, steel roll refiners and various other devices. To obtain a finely ground chocolate liquor it is necessary to decrease the production rate of the grinding or milling, or to subject the chocolate liquor to continued or prolonged milling. The grit particles are harder and more fibrous than the "nibs" proper and are more difficult to grind. Prolonged milling does not actually remove the grit, but decreases the size of the grit particles to the extent that they feel fairly smooth to the tongue.

In accordance with the process of the present invention and pursuant to one of the primary objects thereof, the chocolate liquor instead of being subjected to prolonged grinding or milling to decrease the size of the gritty particles is subjected to treatment for removing the gritty material. More specifically, pursuant to the present invention, the chocolate liquor is centrifuged in suitable centrifugal apparatus in such manner that the gritty material is separated from the liquor by centrifugal force and is continuously removed from the chocolate liquor during the centrifugal action. An important feature and an advantage of this invention is that the physical removal of the gritty material from the chocolate liquor continuously during the centrifugal operation results not only in an improved product but also in greatly increased production and reduced cost.

It has been proposed heretofore to separate gritty substances from chocolate liquor in a centrifugal bowl in which the gritty material was allowed to remain during the centrifugal process. This resulted in the accumulation in the centrifugal bowl of a mass of gritty material together with a quantity of fine cocoa solids which as a result of the centrifugal operation become mixed with and adhere to the gritty particles, thus allowed to accumulate in the centrifugal bowl, thus resulting in a loss from the chocolate liquor of a quantity of fine cocoa solids. I have discovered that in order to accomplish the separation of the gritty particles from the chocolate liquor without at the same time losing fine cocoa solids or other soft and non-gritty particles of the chocolate liquor, it is necessary to centrifuge the chocolate liquor in such manner that the gritty particles are quickly and continuously removed from the liquor during the centrifugal treatment. Moreover, the process of the present invention according to which the gritty material is continuously removed from the chocolate liquor during the centrifugal treatment thereof enables the treatment of the chocolate liquor to be performed as a continuous process and eliminates the objection to the previously proposed process in respect to the necessity for discontinuing the operation at more or less frequent intervals in order to remove the gritty material and other substances added to the gritty material so as to remain therewith in the centrifugal bowl during the centrifugal operation.

The cocoa butter content of chocolate liquor varies considerably, the variation being from about 50% to about 58%, the mean value being about 54%. Due to this variation it is necessary to resort to standardization of the fat content when a product of a definite fat content is desired. This standardization is often accomplished by the addition of either cocoa powder or cocoa butter to the chocolate liquor depending upon whether the cocoa butter fat content is to be increased or decreased. The standardization of the fat content of the liquor by the addition of cocoa powder or cocoa butter gives rise to various production difficulties such as, for example, holding up of production while waiting for the analysis, and for the mixing of the cocoa or cocoa butter into the chocolate liquor batch.

Because of the difficulty and impracticability of standardizing chocolate liquor, unstandardized liquor is used for the production of cocoa powder, sweet chocolates, milk chocolates and various chocolate blends and mixtures. Chocolate liquor is added to chocolate blends in proportion by weight or volume as it is originally obtained from the cocoa nibs, and it, therefore, varies considerably in cocoa butter fat percentage and in cocoa solids percentage. For example, if a formula calls for 100 lbs. of chocolate liquor, the cocoa butter content of the liquor may vary from 50 to 58 lbs. and the cocoa solids from 50 to 42 lbs., thus throwing out of proportion the ratio of the cocoa solids to the rest of the ingredients in the blend. In accordance with the method of the present invention and pursuant to another object thereof, a standardized chocolate liquor is readily obtainable.

Chocolate liquor is a solid at temperatures below the melting point of cocoa butter, about 90° F., and is liquid at temperatures above 90° F. In ordinary factory practice chocolate liquor as obtained from the grinding equipment varies in temperature at from about 140° F. to 240° F. and is usually handled at these temperatures either directly from the mills or from large storage tanks.

Although chocolate liquor in its liquid form can be centrifuged continuously, faster separation of the grit is accomplished in accordance with the present invention and pursuant to another object thereof by diluting the chocolate liquor with a quantity of cocoa butter which allows greater spacing between the cocoa solids particles in suspension in the cocoa butter. The quantity of cocoa butter that may be added to the chocolate liquor may vary considerably but the addition of sufficient cocoa butter to raise the total cocoa butter content to about 70% gives good practical results.

Another object of the invention is to provide a method of treating chocolate liquor whereby to obtain therefrom a product consisting of or containing a high percentage of cocoa butter, for example, cocoa butter containing only about 5% or less of very fine cocoa solids in suspension.

Another object of the invention is to provide a method of treating chocolate liquor in such manner as to provide for the production of superior products such as cocoa powders, sweet chocolate, milk chocolate, and various other mixtures and products which are derived from or contain chocolate liquor in their composition.

The present invention will be fully understood from the above and from the following description with reference to the accompanying illustrative drawings which show more or less diagrammatically one type of apparatus which may be used in carrying out the process of this invention.

For the purpose of illustrating and further explaining this invention, I will now describe an example of the production of chocolate liquor in accordance with this invention, it being understood that this example is illustrative and not in limitation.

13,000 lbs. of chocolate liquor at about 220° F. containing about 2.3% of grit or particles not passing a 150 mesh sieve is mixed with 7,000 lbs. of cocoa butter at about 180° F. The mass is fed in continuously at the rate of approximately 20,000 lbs. per hour into a continuous centrifuge. The heavy particles consisting of grit are deposited on the walls of the centrifuge and are continuously scraped and wormed out of the centrifuge by suitable means.

An outlet is provided at a suitable point for the overflow of chocolate liquor freed from grit and containing approximately 54% cocoa butter. Another outlet is provided at a suitable point to allow for the overflow of the supernatant cocoa butter containing approximately 5% of very fine cocoa solids in suspension. The grit or coarse particles which are continuously removed from the centrifuge amounting to about 12% or 1,400 lbs. of the original mixture and containing about 40% cocoa butter is subjected to either further grinding or the cocoa butter is expressed therefrom by means of an expeller or other suitable device.

The grit free chocolate liquor of approximately 54% cocoa butter amounting to approximately 44.75% or 8,950 lbs. is used for the production of moulded chocolate liquor, cocoa powder, or as an ingredient in the manufacture of various chocolate products. The supernatant cocoa butter containing approximately 5% of very fine cocoa solids in suspension and amounting to approximately 43.25% or 8,650 lbs. of the original mixture is subjected to either filtration or further centrifuging to recover the very fine cocoa solids which may be used for the production of a superfine cocoa powder or other improved cocoa and chocolate products. The cocoa butter resulting therefrom can be added to another portion of chocolate liquor to be centrifugally treated for the removal of the grit as heretofore described.

The supernatant cocoa butter containing the very fine suspended cocoa solids can if desired be added as a whole to another portion of the original chocolate liquor to dilute same for the centrifugal treatment thereof.

As a result of the above mentioned separation of chocolate liquor the grit content of the liquor not passing a 150 mesh sieve was approximately 2.3% before treatment and approximately 0.08% after treatment.

Any suitable apparatus can be utilized for carrying out the process of the present invention. In the accompanying drawing one form of apparatus is illustrated more or less diagrammatically and as shown comprises a centrifuge 10 in which the chocolate liquor is centrifuged in accordance with the present invention. Said centrifuge comprises a rotary casing 12 of conical form and a rotary screw conveyor 14 which is positioned within said casing and which rotates therein at a lower speed of rotation than that of the casing but in the same direction of rotation. The chocolate liquor is supplied to the centrifuge in liquified condition from the supply tank 16 which, if desired, may be provided with a jacket 18 for steam or other heating medium to maintain the chocolate liquor in liquified condition at the desired temperature. The chocolate liquor is conveyed in liquid form to tank 16 through the inlet pipe 20 which if desired may be connected to the outlet of the mill, that is the usual multiple stone mill, in which the chocolate liquor is produced.

The chocolate liquor flows from tank 16 to the centrifuge through a delivery pipe 22 which is connected by a coupling 24 to the inlet pipe or hollow shaft 26 of the centrifuge, said pipe being perforated as shown for the passage of the chocolate liquor therefrom into the centrifuge casing, said pipe being closed at its outer end 28. Pipe 26 extends axially of casing 12 and preferably, as here shown, is part of the screw conveyor 14, being rotatable therewith. The casing is open at its narrower end 30 and communicates with a stationary discharge chamber 32 into which the gritty and coarse material separated from the chocolate liquor in the centrifuge is continuously discharged during the operation of the centrifuge by reason of the relative rotation between the centrifuge casing 12 and the rotary screw conveyor 14. Pipe or shaft 26 can be rotated in any suitable way, for example, by a pulley 29, and casing 10 which is mounted for rotation about said shaft 26 can also be rotated in any suitable way as by a gear 31.

The wider end 34 of rotary casing 12 is provided with one or more outlet openings 36 and one or more outlet openings 38 at different radial distances from the axis of rotation of said casing. Discharge openings 36 and 38 deliver to stationary chambers 40 and 42, respectively, for receiving the liquids of different specific gravities which are separated from each other by centrifugal action during the operation of the centrifuge while the gritty material which is separated from the chocolate liquor is discharged through the outlet opening 30. It will be understood that the liquid of higher specific gravity is delivered through the outlet opening or openings 36 since the latter are farther from the axis of rotation of casing 12 while the liquid of lower specific gravity is discharged through the outlet opening or openings 38 which are closer to the axis of rotation. While openings 36 and 38 are illustrated as in fixed relation to the axis of rotation radially thereof, it will be understood that the apparatus may be provided with means for adjusting the position of said outlet openings, respectively, in respect to their respective radial distances from the axis of rotation of casing 12 so that the liquids discharging from casing 12 through said outlet openings are of predetermined different specific gravities, respectively, depending upon the location of said outlet openings, other factors remaining the same. Chambers 40 and 42 are provided with outlet pipes 44 and 46, respectively, to deliver the separated liquids to any desired points.

The apparatus is preferably provided with means for adding cocoa butter to the chocolate liquor in the supply tank 16 preferably by delivering a portion of the liquid of higher cocoa butter content, which is discharged from rotary casing 12 through outlet openings 38, to the supply tank 16. For this purpose, the liquid of higher cocoa butter content is transferred through outlet pipe 44 in any suitable way as by a pump 48 to a tank 50 and from the latter through a delivery pipe 52 in any suitable way as by a pump 54 to the supply tank 16. Tank 50 is provided with an outlet 56 for the discharge therefrom of the liquid which may accumulate in tank 50 during the operation of the apparatus in a quantity larger than that required for mixing with the chocolate liquor in supply tank 16. It will be understood that when the process is carried out without the addition of cocoa butter to the chocolate liquor, the liquid of high cocoa butter content may be delivered directly to a collection receptacle (not shown) through a valved branch outlet pipe 58 instead of to tank 50 or, alternatively, to the latter in which case pump 54 is not operated, valve 60 which is provided in the inlet to said pump being closed.

It will be understood that the method of the present invention is adaptable to various changes without departing from the principles thereof within the scope of the appended claims.

Having thus described my invention, what I claim and desire to secure by Letters Patent is:

1. The method of treating chocolate liquor containing gritty material, which comprises centrifuging the chocolate liquor in liquid form, and continuously removing from the centrifuge, during the centrifugal operation, separate constituent volumes of liquids containing different predetermined proportions, respectively, of cocoa-butter.

2. The method of treating chocolate liquor which comprises adding cocoa-butter to chocolate liquor to enrich the cocoa-butter content thereof, centrifuging the enriched chocolate liquor in liquid form, and continuously removing from the centrifuge during the centrifugal operation and as separate constituent volumes, respectively, a liquid containing a predetermined proportion of cocoa-butter and a liquid containing cocoa-butter in a proportion different from that of said first mentioned separated liquid.

3. The method of treating chocolate liquor which comprises adding cocoa-butter to chocolate liquor to enrich the cocoa-butter content thereof, centrifuging the enriched chocolate liquor in liquid form, and continuously removing from the centrifuge during the centrifugal operation and as separate constituent volumes, respectively, gritty material, a liquid containing cocoa-butter in a predetermined proportion, and a liquid containing cocoa-butter in a proportion different from that of said first mentioned separated liquid.

4. The method of treating chocolate liquor containing gritty material, which comprises centrifuging the chocolate liquor in liquid form, and continuously removing from the centrifuge, during the centrifuging operation, separate constituent volumes, respectively, of gritty material and chocolate liquor substantially free from gritty material.

5. The method of treating chocolate liquor which comprises centrifuging the chocolate liquor in liquid form, and continuously removing from the centrifuge during the centrifugal operation and as separate constituent volumes, respectively, a liquid containing a predetermined proportion of cocoa-butter and a liquid containing cocoa-butter in a higher proportion than that of said first mentioned separated liquid.

6. The method of treating chocolate liquor which comprises supplying chocolate liquor in liquid form to a centrifuge to separate the inherent gritty material from the chocolate liquor by centrifugal action, and continuously removing from the centrifuge during the operation thereof as separate constituent volumes, respectively, the gritty material and the liquid from which the gritty material has been separated by the centrifugal action.

7. The method of treating chocolate liquor which comprises supplying chocolate liquor in liquid form to a centrifuge to separate the inherent gritty material from the chocolate liquor by centrifugal action, removing the separated gritty material from the centrifuge while the chocolate liquor is being centrifuged, and simultaneously removing from the centrifuge as separate constituent volumes, respectively, a liquid containing a predetermined proportion of cocoa-butter and a liquid containing a substantially higher proportion of cocoa-butter.

WALLACE T. JONES.

REFERENCES CITED

The following references are of record in the file of this patent:

UNITED STATES PATENTS

| Number | Name | Date |
| --- | --- | --- |
| 1,857,430 | Clark | May 10, 1932 |
| 1,381,694 | Bausman | June 14, 1921 |